Sept. 11, 1923.  1,467,669
L. C. JOSEPHS, JR., ET AL
FURNACE FOR THE HEAT TREATMENT OF METALS
Filed Oct. 9, 1920   2 Sheets-Sheet 1

INVENTORS
Lyman C. Josephs Jr.
and Gottfried Herres
BY
Redding Greeley
ATTORNEYS Sept. 11, 1923. 1,467,669
L. C. JOSEPHS, JR., ET AL
FURNACE FOR THE HEAT TREATMENT OF METALS
Filed Oct. 9, 1920 2 Sheets-Sheet 2
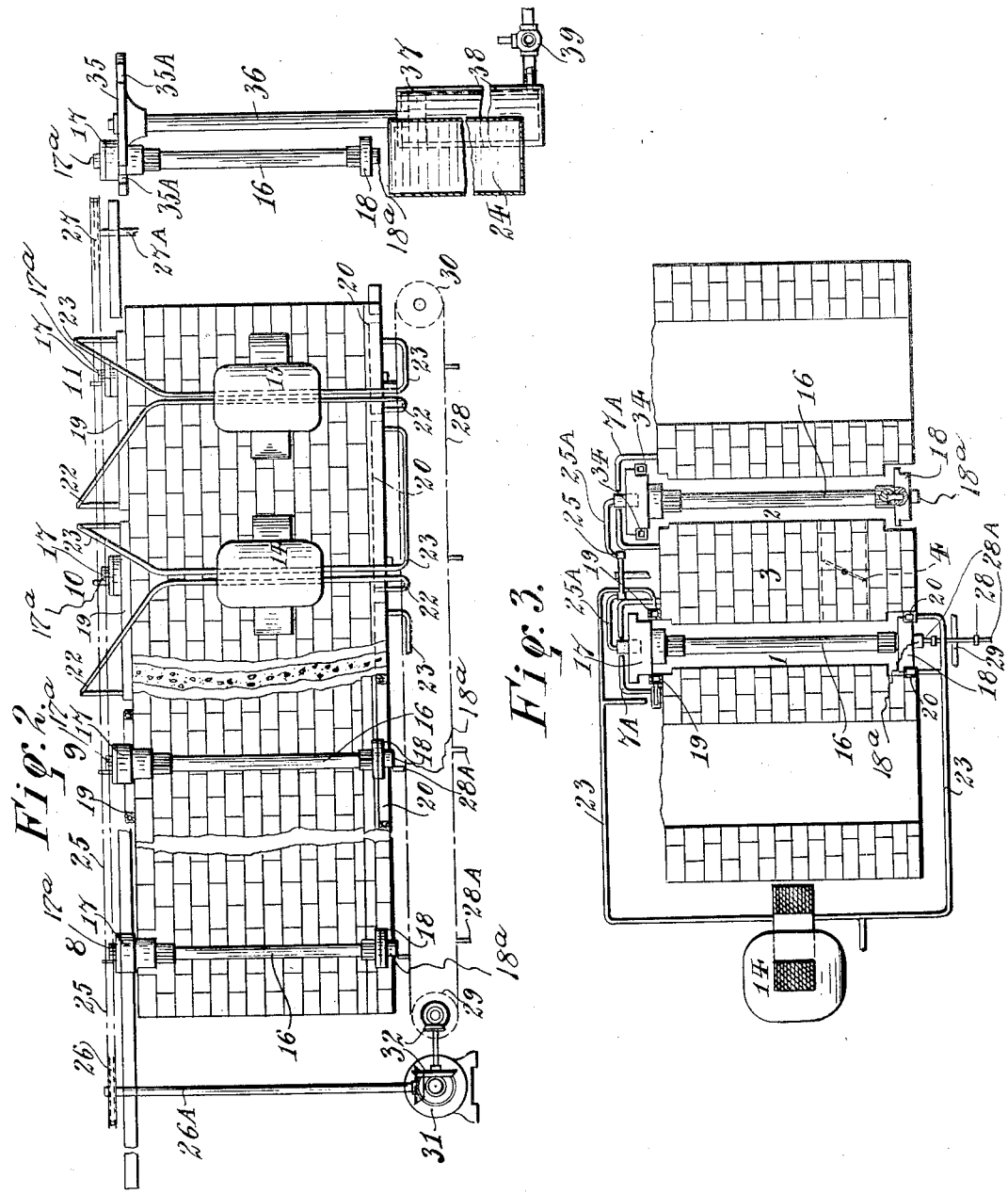
INVENTORS
Lyman C. Josephs Jr.
Gottfried Wirrer
BY
Redding & Feeley
ATTORNEYS Patented Sept. 11, 1923.

1,467,669

UNITED STATES PATENT OFFICE.

LYMAN C. JOSEPHS, JR., OF ALLENTOWN, PENNSYLVANIA, AND GOTTFRIED WIRRER, OF PLAINFIELD, NEW JERSEY, ASSIGNORS TO INTERNATIONAL MOTOR COMPANY, OF NEW YORK, N. Y., A CORPORATION OF DELAWARE.

FURNACE FOR THE HEAT TREATMENT OF METALS.

Application filed October 9, 1920. Serial No. 415,804.

*To all whom it may concern:*

Be it known that we, LYMAN C. JOSEPHS, Jr., and GOTTFRIED WIRRER, citizens, respectively, of the United States and the Swiss Republic, residing, respectively, in Allentown, in the State of Pennsylvania, and city of Plainfield, in the State of New Jersey, have invented certain new and useful Improvements in Furnaces for the Heat Treatment of Metals, of which the following is a specification, reference being had to the accompanying drawings, forming a part hereof.

In other applications for Letters Patent of the United States, made by the present applicants, Ser. Nos. 390,796 and 390,797, filed June 22, 1920, there are described certain improvements in methods of the heat treatment of metals, in accordance with which the determination of the critical point in the treatment of metal is dependent upon the rate of change of dimension of the metal and the change in heat treatment is initiated through a change in the rate of change of dimension of the metal. Such change in the rate of change of dimension of metal under treatment has been found to be much more satisfactory in determining the critical point of the metal than the change in the temperature or in the rate of change of temperature of the metal under treatment or of a medium external to the metal under treatment. The object of the present invention is to provide a furnace in which the methods referred to can be practised advantageously and in which the heat treatment of metal can be carried on advantageously in other respects. The furnace illustrated as an embodiment of the present invention is designed particularly for the heat treatment of shafts and other articles, the length of which is many times the diameter. In the handling of such articles, as in transferring them from the furnace to the quenching bath and in other operations, as heretofore generally carried on, undesirable results frequently follow from a lack of uniformity in the heating of all parts of the article under treatment, the chilling of one part more rapidly than another, and mechanical distortion. In the improved furnace which is the subject of the present case provision is made whereby a uniform rate of heating is secured, together with uniform maximum temperature, a uniform time for quenching, and a uniform period of quenching, while the article under treatment is held always in the same position and mechanical distortion is prevented. The invention will be more fully explained hereinafter with reference to the accompanying drawings in which it is illustrated and in which—

Figure 2 is a view of the same in side elevation.

Figure 3 is a view of the same in transverse vertical section.

Figure 1:
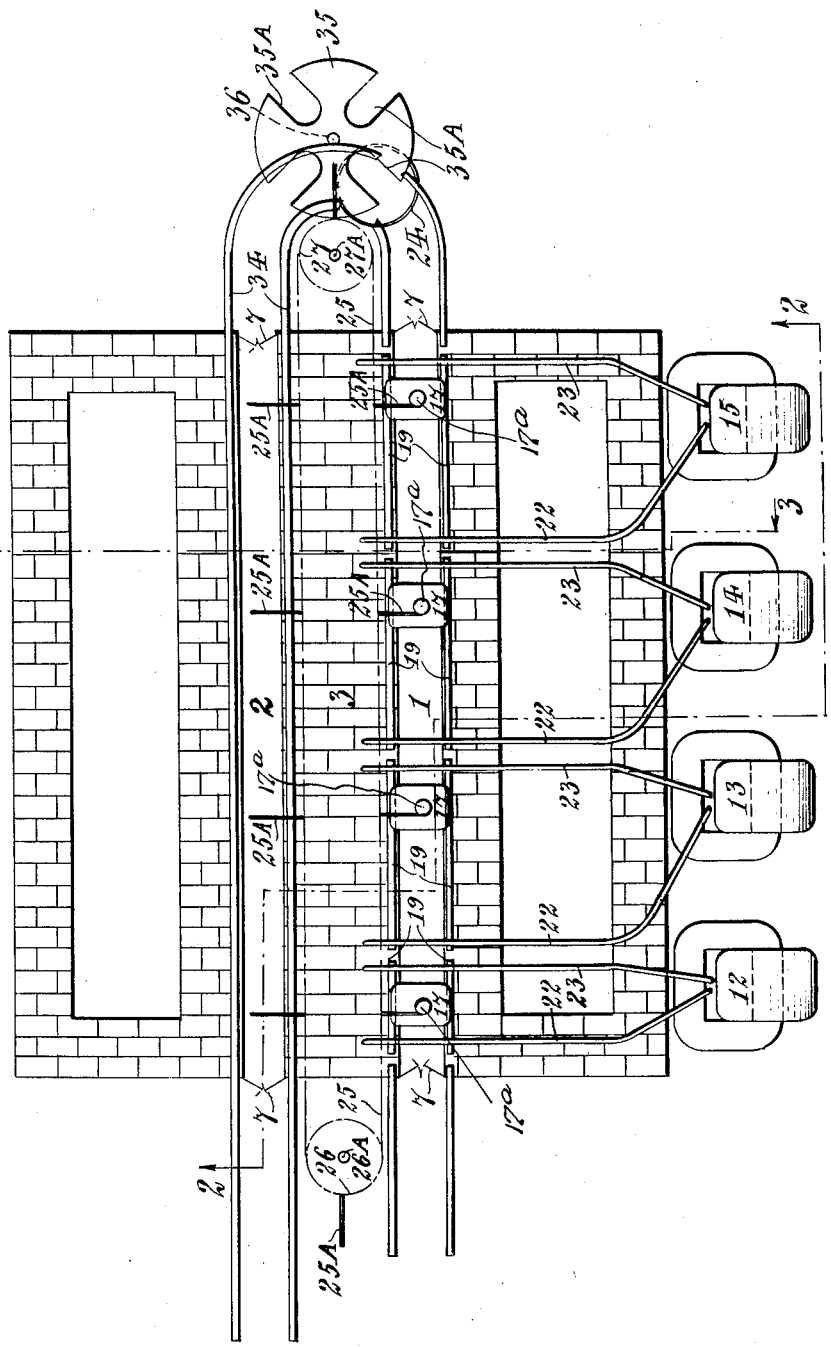
Figure 1 is a top view of a furnace constructed in accordance with the invention.

The walls of the furnace are built of suitable material to form two parallel narrow chambers or passages, 1 and 2. The chamber 1 is the hardening chamber in which the higher temperature prevails, while the chamber 2 is the drawing chamber in which a lower temperature prevails and therefore may receive its heat through suitably controlled openings 4 in the partition wall 3. Each chamber 1 and 2 is provided at each end with swing doors 7, suitably constructed of iron and fire-brick, but indicated conventionally in the drawings, these doors being arranged to open freely in the direction of travel of the article under treatment, opening with the passage of an article into or out of the chamber and closing behind it. Each chamber 1 and 2 is closed at the top, except for a narrow slot which permits the travel of the article or its supporting device, by means of cover plates 7<sup>A</sup>.

As means for supplying heat to the articles in chamber 1 there are shown in the drawings four electrical transformers, 12, 13, 14, and 15, so that the rate of heating at each heating station 8, 9, 10 and 11 can be controlled independently, and each transformer is shown as connected by conductors 22 and 23 with upper contact rails 19 and lower contact rails 20. Both the conductors 22 and 23 and the rails 19 and 20 are preferably hollow, as shown, so that cooling water may circulate through them, the conductors 22 and 23 being preferably made as pipes of brass or copper, while the rails 19 and 20 are made of a suitable alloy of low conductivity and capable of resisting the heat of the furnace. It will be observed that the rails 19 and 20 are formed in successive sections and that the upper rail sections 19 break joints with the lower rail sections 20, as indicated in Figure 2, the sectioning of the rails preventing the paralleling of the transformer secondaries and the breaking of joints or the staggering of sections preventing one article from being heated from two transformers at the same time.

Each shaft or other article 16 to be treated is fixed at its lower end to a contact block 18, of a suitable heat-resisting metal such, for example, as nickel-chromium alloy, which slides on and between the lower contact rails 20, which thus support the article 16 while it is moving through the chamber 1 and deliver electric current from the transformer to the lower end of the article 16 which, being resistant, becomes heated by the passage of the electric current. The upper end of the article 16 has fixed to it a similar block 17 of heat-resisting metal, which slides between the upper rails 19 and in contact therewith, but does not rest on them, permitting free vertical movement of the contact block as the article 16 expands with increase in temperature. Each article to be treated may be fixed at each end to the corresponding contact block by any suitable means.

The travel of each shaft or article 16 through the chambers of the furnace is effected by endless chains 25 and 28, the former being carried by sprocket wheels 26 and 27, carried by vertical shafts 26$^A$ and 27$^A$ respectively, and the chain 28 being carried by sprocket wheels 29 and 30 mounted on horizontal axes. The sprocket wheels 26 and 29 may be driven through suitable gearing at 32, from a motor indicated at 31. Secured to the chain 25, at regular intervals are driving lugs 25$^A$ which engage lugs 17$^A$, of lava or other suitable insulating material, fixed to the contact blocks 17. In like manner the chain 28 is provided with correspondingly disposed driving lugs 28$^A$ which engage lugs 18$^A$ of insulating material on the contact blocks 18. In its passage through the drawing chamber 2, in which current is not supplied, the article 16 under treatment is carried in a depending position by the return member of the chain 25 only.

When the article to be treated has passed from the hardening chamber 1, now supported only by the upper rails 19, the lower part of the contact block 17 enters one of the notches 35$^A$ of a notched turntable 35, the supporting rails being cut away to permit the rotation of the turntable with the article under treatment. The turntable is rotatably carried by a plunger rod 36 which is supported by a piston 37 in a cylinder 38, to which fluid under pressure is admitted and from which such fluid is permitted to escape under control of a valve 39 which is actuated by suitable means. As the article to be treated passes into the notch of the turntable the continued movement of the article with the chains causes the turntable to be rotated partially so as to place the article to be treated immediately above the quenching tank 24. When the article has reached this position the movement of the chains (which is intermittent) ceases and the valve 39 is then operated to permit the liquid in the cylinder 38 to escape, thereby lowering the turntable and plunging the article into the quenching tank. After a suitable interval of time the valve 39 is again manipulated or moved by suitable means to connect the cylinder 38 to the source of supply of fluid and the plunger 37 is therefore raised, raising the turntable and carrying with it the article to be treated which is thus brought into position to be engaged again by the upper chain and is carried onward out of the notch of the turntable (which is partially rotated again as the chain moves) and is carried on into the drawing chamber 2 where, in its further passage, it rests upon the rails 34.

In the operation of the improved furnace it will be understood that through suitable means, not necessary to be described herein since they may be of ordinary construction, the chains 25 and 28 receive an intermittent movement, the extent of which, at each operation, is sufficient to carry the article to be treated first from the point where it is first engaged by the chain 25 and then by the chain 28, into the first heating station. The movement of the chains then ceases and, by the passage of the electric current from the conducting rails 19, through the article to be treated, to the conducting rails 20, the article is heated. After the proper lapse of time the movement of the chains is resumed and the first article is carried on to the next heating station while a second article is brought into the first heating station. This operation is continued as each article in succession is moved through the successive heating stations of the first chamber 1, is lowered into the quenching tank and raised again to be engaged by the upper chain 25 alone, and is then carried onward through the drawing chamber 2, from which it eventually emerges on the non-conducting rails 34, and is removed by any suitable means. The chains might be operated by hand power through any suitable means and the three-way valve 39 might be controlled by hand to cause the cylinder 38 to be connected at the proper time with the delivery side of a suitable pump or with the suction side, but in practise the movement of the chains and of the pump might be effected by automatic means controlled by the rate of expansion of the article being treated, in accordance with the methods described in the pending applications hereinbefore mentioned. It will be understood, furthermore, that the details of construction of the furnace will be varied to suit different conditions of use and that the invention, except as pointed out in the accompanying claims, is not limited to the particular construction shown and described herein.

In the present application it is sought to cover only the construction of the furnace. The automatic devices through which a change in the heat treatment is brought about, are not shown, described or claimed in this application, but are described in detail and are made the subject of claim in another application.

We claim as our invention:

1. In a furnace for the heat treatment of metals, the combination of a heating chamber, means to move progressively through the chamber the article to be heat treated, contact rails to deliver electric current to the article as it is moved through the chamber, and means to supply electric current to such rails.

2. In a furnace for the heat treatment of metals, the combination of a heating chamber, means to move progressively through the chamber the article to be heat treated, sectional contact rails to deliver electric current to the article as it is moved through the chamber, and means to supply electric current to such sectional contact rails.

3. In a furnace for the heat treatment of metals, the combination of a heating chamber, means to move progressively through the chamber the article to be heat treated, sectional contact rails to deliver electric current to the article as it is moved through the chamber, and transformers to supply current severally to the rail sections.

4. In a furnace for the heat treatment of metals, the combination of a heating chamber, means to move progressively through the chamber the article to be heat treated, sectional contact rails to deliver electric current to the article as it is moved through the chamber, and transformers to supply current severally to the rail sections, the conductors from the transformers to the rail sections and the rail sections being tubular to receive a cooling liquid.

5. In a furnace for the heat treatment of metals, the combination of a heating chamber, means to move progressively through the chamber the article to be heat treated, means to heat such article progressively as it is moved through the chamber, a heat-resisting block to which the article is connected, and rails to support such block with the article during the passage through the chamber.

6. In a furnace for the heat treatment of metals, the combination of a heating chamber, means to move progressively through the chamber the article to be heat treated, contact rails, means to supply electric current to such contact rails, and a heat-resisting block connected to the article and resting on the contact rails during the movement of the article.

7. In a furnace for the heat treatment of metals, the combination of a heating chamber, means to move progressively through the chamber the article to be heat treated, upper and lower contact rails, means to supply electric current to the contact rails, and a contact block connected to the article and supported on the lower rails during the movement of the article, the upper rails being adapted for contact with the article.

8. In a furnace for the heat treatment of metals, the combination of a heating chamber, an endless chain adapted to engage operatively each article to move it through the heating chamber, contact rails to deliver electric current to the article as it is moved through the chamber, and means to supply current to such rails.

9. In a furnace for the heat treatment of metals, the combination of a heating chamber, a quenching tank, means to move progressively through the chamber the article to be heat treated, means to subject such article to varying degrees of heat in separate stages as it is moved through the chamber, and means to transfer the article to the quenching tank.

10. In a furnace for the heat treatment of metals, the combination of a heating chamber, a conveyor to convey each article through the chamber, means to heat such article progressively as it is moved through the chamber, a quenching tank, and means to transfer the article from the conveyor to the quenching tank and to restore the article from the quenching tank of the conveyor.

11. In a furnace for the heat treatment of metals, the combination of a heating chamber, a conveyor to convey each article through the chamber, means to heat such article progressively as it is moved through the chamber, a quenching tank, means to transfer the article from the conveyor to the quenching tank and to restore the article from the quenching tank to the conveyor, a receiver to receive the article from the conveyor, and means to lower and raise the receiver to plunge the article into the quenching tank and to raise it therefrom.

12. In a furnace for the heat treatment of metals, the combination of a heating chamber, a conveyor to convey each article through the chamber, means to heat such article progressively as it is moved through the chamber, a quenching tank, means to transfer the article from the conveyor to the quenching tank and to restore the article from the quenching tank to the conveyor, a receiver to receive the article from the conveyor, means to lower and raise the receiver to plunge the article into the quenching tank and to raise it therefrom, a notched turntable to receive the article from the conveyor, and means to lower and raise the turntable to plunge the article into the quenching tank and to raise it therefrom.

13. In a furnace for the heat treatment of metals, the combination of a heating chamber, a drawing chamber parallel with the heating chamber, an endless conveyor to move progressively through the heating chamber and thence into and through the drawing chamber the article to be heated, and means to heat the article progressively as it is moved through the heating chamber.

14. In a furnace for the heat treatment of metals, the combination of a heating chamber, a drawing chamber, means to move the article to be heat treated through the heating chamber and thence into and through the drawing chamber, means to heat the article progressively as it is moved through the heating chamber and means to heat the drawing chamber by the transfer of heat from the heating chamber.

15. In a furnace for the heat treatment of metals, the combination of a heating chamber, a drawing chamber, means to move the article to be heat treated through the heating chamber and thence into and through the drawing chamber, means to heat the article progressively as it is moved through the heating chamber, and controllable means to conduct heat from the heating chamber to the drawing chamber.

This specification signed this 3d day of Sept. A. D. 1920.

LYMAN C. JOSEPHS, Jr.
GOTTFRIED WIRRER.